Jan. 14, 1936.  A. C. HOFFMAN  2,027,823
BRAKE LINING DEVICE
Filed April 3, 1935
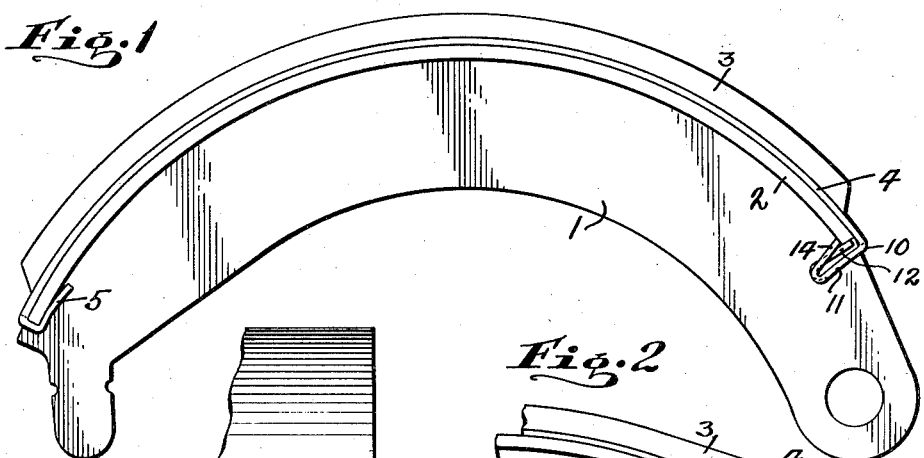
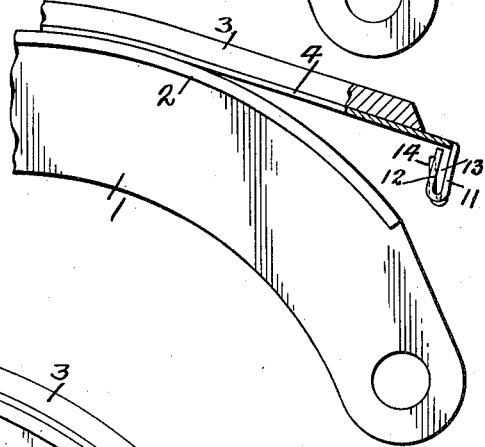
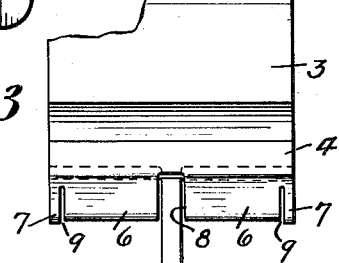
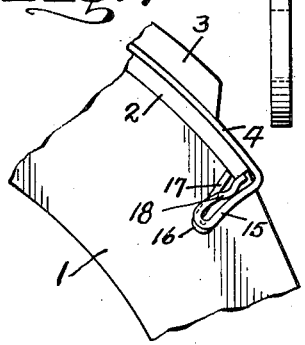
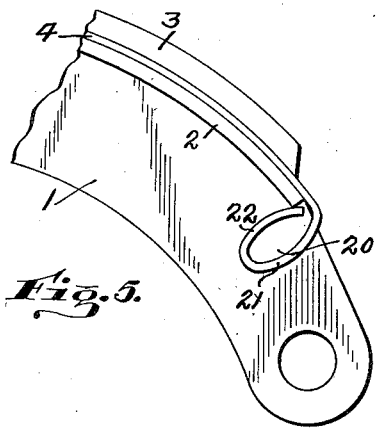
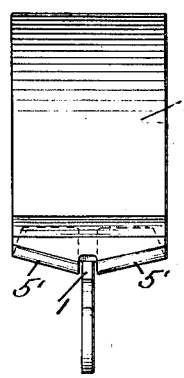
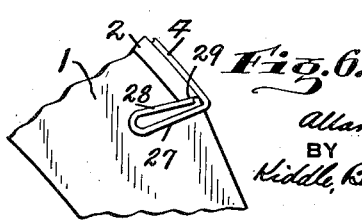
INVENTOR
Allan C. Hoffman.
BY
Kiddle, Bethell and Montgomery
ATTORNEYS.

Patented Jan. 14, 1936

2,027,823

UNITED STATES PATENT OFFICE 2,027,823

BRAKE LINING DEVICE

Allan C. Hoffman, Englewood, N. J., assignor to Hoffman Brakes, Inc., New York, N. Y., a corporation of New York Application April 3, 1935, Serial No. 14,460

13 Claims. (Cl. 188—234)

My invention is directed to brake lining devices and to the method of applying the same to a brake shoe.

Primarily my invention is directed to brake lining devices for brakes of the internal expansion type as distinguished from the external contracting type, that is to say, brake structures where the convex surface of the brake lining is forced into frictional contact with the concave inner surface of the brake drum.

In lining brakes in accordance with the present practice it is practically universally customary to rivet the lining material to the shoe. Not only is this a costly procedure, but it necessarily weakens the friction material, reduces the thickness of available lining,—the brakes must be relined when the lining has worn down to the rivet heads—prevents the use of a continuous brake surface, the active surface of the material necessarily being interrupted by the rivet holes, and last but not least the lining of brakes by the riveting method is the job of a skilled mechanic and entails several hours work in lining, for example, the four wheel brakes of the modern motor car.

I shall not attempt to mention all of the objectionable features inherent in brake linings as now constructed and attached to the brake shoe—they are well known to those skilled in this art, and many attempts have been made to overcome them.

The present invention provides for the elimination of rivet holes in the brake shoe and brake lining, provides for a materially increased brake life as compared with the rivet method; and finally provides a brake lining device which can be attached to the shoe without the necessity of special tools or skilled labor and without the necessity of removing the brake shoes. As a matter of fact, I have lined a shoe repeatedly without the use of any tools other than my hands.

My improved construction is such as to ensure that the lining will be immovably affixed to the shoe, thereby avoiding all possibility of slippage and maladjustment of the brake.

In general my invention provides a brake lining device in which the friction material is secured to a metallic attaching band, the latter being secured under tension to the brake shoe. No rivets are necessary in securing the friction material to the attaching band nor for securing the attaching band to the brake shoe.

In the accompanying drawing:

Fig. 1 is a side elevational view of one embodiment of my invention showing the lining device in position on a brake shoe;

Fig. 2 is a fragmentary view, partly in elevation and partly in section, of the structure of Fig. 1 but before the lining device is finally affixed to the shoe;

Fig. 3 is an end view of Fig. 1;

Fig. 4 is a fragmentary elevational view of a modification;

Figs. 5 and 6 are similar views of additional modifications; and

Fig. 7 is an end view of a modification of the left end of the structure illustrated in Fig. 1.

Referring to Figs. 1, 2 and 3. The brake shoe is shown as provided with web 1 and flange 2, as is customary, and the brake lining device is to be applied to the convex surface of the flange 2 as will be understood.

3 designates the friction material of my improved brake lining device and this material is permanently secured to a metallic attaching band 4. The friction material may be the usual material employed in brake linings, moulded, semi-moulded, or woven, and may be cured directly to the outer face of the attaching band. I have found this to be sufficient, although if desired prongs may be struck up out of the face of the attaching band upon which the friction material is impaled. Other constructions may be employed, as may be found desirable, the desideratum being, however, that the use of rivets or other device which would interrupt the continuity of the active or braking face of the friction material be avoided.

One end of the attaching strip or band 4 is provided with fingers 5, shaped, as will be seen from the drawing, so as to interlock with one end of the flange 2 of the brake shoe. These fingers may be pre-formed, tempered fingers, if desired, although this is not essential to the successful practice of my invention.

The other end of the attaching strip is provided with two sets of pre-formed tempered or spring fingers, one set being designated 6, the other 7.

The fingers 6 are formed by slotting the end of the strip 4 as shown at 8 and 9 and then bending the end of the strips between these slots downwardly as shown at 10 and then back upon itself. Each finger 6 might be said to be composed of integral front and rear spring members or fingers 11 and 12, respectively, the rear member 12 throughout its extent being slightly spaced from the front member as shown at 13 for a purpose hereinafter set out.

The fingers 7 are formed in a similar manner, except, as will be seen from the drawings, the rear member 14 of each of these fingers lies, throughout part of its length at least, to the rear of the plane of the rear face of the member 12 of the fingers 6. The rear members of the fingers 7 are shorter than the corresponding members of the fingers 6.

The slot 8 makes provision for the reception of the web of the shoe, as will be understood.

In applying my brake lining device to a brake shoe, the end of the band 4 is bent over and interlocked with the end of the flange 2 of the brake shoe, or if the pre-formed fingers 5 are employed they are interlocked with the end of the flange as shown in Fig. 1, and then, while wrapping the attaching strip over the curved face of the flange of the shoe with a wrapping tension, pressure is exerted on the upper face of the free end of the attaching strip compressing the fingers 6 and 7 and forcing the same downwardly over the end of the flange 2 until the free end of each of the fingers 7 snap beneath the flange, as illustrated in Fig. 1, while the rear members 12 of each of the fingers 6 bears against the end of the flanges under tension.

I have found that the above described construction provides a brake lining device which can be readily applied, in fact without tools at all, and without dismounting the brake shoe, and yet by reason of the spring of the fingers 6 and 7 the device is held securely to the shoe under a wrapping tension, which successfully resists movement of any kind, of the lining on the shoe, when the brake is in service.

It will be appreciated that to remove the lining device it is merely necessary to compress the fingers 7 until the free end of each of the members 14 thereof clears the end of the shoe flange, whereupon the end of the device may be readily pried loose.

It will be understood also when the friction material 3 is worn down to such an extent as to be no longer serviceable, the assembly is removed from the shoe and a new length of friction material may be secured to the attaching strip.

In the embodiment of my invention as illustrated in Fig. 4 one end of the attaching strip 4 is provided with pre-formed spring fingers 15 and 16. As in the embodiment of my invention already described, these fingers are composed of front and rear members. The rear members 17 of the fingers 16 lie adjacent the web of the shoe, and stand in a plane which is to the rear of the plane of the rear face of the rear members 18 of the fingers 15. The rear members 18 of the fingers 15 are more or less S-shaped adjacent their free ends, so that when the assembly is sprung into place on a shoe, in much the same manner as the assembly of Fig. 1, the rear face of the upper end of each of these members will bear against the end of the shoe flange 2 while the front face of each of these members an appreciable distance below the upper end of the member will bear against the rear face of the front member of the finger, acting as a fulcrum to hold the assembly to the shoe under wrapping tension. The rear member 17 of each of the fingers 16, with the device snapped in place, engage beneath the shoe flange in much the same manner as the members 14 of Fig. 1.

In the embodiment of my invention illustrated in Fig. 5 I have shown the end of the attaching strip 4 provided with pre-formed spring fingers 20 formed by bending the end of the strip so as to form an open loop composed of a front member 21 and an integral rear member 22. The free end 23 of the rear member 22 bears against the lower edge of the shoe flange with the member 22 under tension when the attaching strip is applied to the shoe flange, thereby resisting endwise movement of the assembly on the shoe and holding the assembly under a wrapping tension.

In this embodiment of my invention the device is sprung into place on the shoe in the same manner as set out in the structure of Fig. 1.

In Fig. 6 one end of the attaching strip 4 is provided with pre-formed spring tempered fingers composed of integral members 27 and 28. The end of the flange 2 of the brake shoe in this instance is undercut or beveled as shown at 29, and the rear member 28 of the spring fingers is so shaped as to lie flat against this beveled portion of the shoe flange with the upper end of the member 28 below the upper edge of the bevel, holding the attaching strip to the shoe flange under tension and resisting endwise movement of the assembly on the shoe, as well as outward movement of the end of the attaching strip.

Fig. 7 shows the end of the attaching strip corresponding to the left hand end of the strip illustrated in Fig. 1. In this construction the end of the shoe flange is cut at a slant to the web 1, viewing the attaching strip in plan, and the fingers 5' are shaped to conform thereto.

In all the embodiments of my invention above described it is to be understood the fingers at either or both ends of the attaching strip may be integral with the attaching strip as illustrated, or welded, riveted or otherwise permanently attached thereto. The attaching strip may be a solid steel band as illustrated, or perforated, or it may be metal mesh. In the latter event the pre-formed fingers at each end thereof are preferably welded thereto.

It is to be understood, furthermore, that in each form of device above described the assembly is snapped into place on the brake shoe.

What I claim is:—

1. A brake lining device comprising in combination a strip of friction material, a metallic attaching band to which the friction material is attached and preformed fingers at the ends of the attaching band, the fingers at one end of the attaching band being in the form of a spring loop having a free end adapted to engage the end of the flange of a brake shoe to hold the attaching band upon the shoe under tension.

2. Brake mechanism comprising in combination a brake shoe having a peripheral flange, a metallic attaching band, friction material secured to the face of said band, fingers carried by one end of said band and interlocked with one end of said flange, and spring fingers at the other end of said attaching band engaging the other end of said brake shoe flange under tension thereby holding the attaching band to the shoe under tension.

3. A brake lining device comprising in combination a strip of friction material, an attaching strip carrying said material and to which the same is secured, fingers at one end of said attaching strip adapted for interlocking engagement with one end of the flange of a brake shoe upon which the device is to be mounted, and U-shaped spring fingers at the other end of the attaching strip for tension engagement with the adjacent end of the brake shoe flange.

4. Brake mechanism comprising in combination a brake shoe having a peripheral flange, a metallic attaching band, a strip of friction material secured to the face of said band, one end of said band being interlocked with one end of said flange, the band lying upon the face of the flange and extending to the other end of the flange, U-shaped spring fingers under tension at this end of the flange engaging the end of the shoe flange to hold the attaching strip to the shoe under tension.

5. A brake lining device comprising in combination an attaching band, friction material secured to the face of said band, metal fingers at one end of said band for interlocking with one end of the flange of a brake shoe, spring metal fingers at the other end of said band, each of said fingers being composed of a front member and a rear member, the rear member of one of the said fingers terminating short of the corresponding member of the other finger, and lying at least throughout part of its extent to the rear of said corresponding member.

6. In combination a flanged brake shoe, an attaching band, friction material secured to the face of said attaching band, one end of said band being interlocked with one end of said flange, said band overlying the flange and extending to the other end thereof, and fingers of spring metal at this end of the attaching band, each finger being composed of a front member and a rear member, the rear member of one finger engaging the end of the brake shoe flange with a spring pressure, the rear member of the other finger being hooked under the brake shoe flange.

7. A brake lining device comprising in combination an attaching band, friction material secured to the face of said band, means at one end of said band for attaching the same to one end of a brake shoe flange, spring fingers at the other end of said band for securing the other end of the attaching band to a brake shoe, one of said fingers being adapted to engage the end of a brake shoe flange, the other to engage the underside of the brake shoe flange.

8. In combination a flanged brake shoe, an attaching band, friction material secured to the face of said attaching band, one end of said band being interlocked with one end of said flange, said band overlying the flange and extending to the other end thereof, and fingers of spring metal at the last named end of said band, one of said fingers engaging the end of the flange of the brake shoe, the other engaging the underside of the brake shoe flange.

9. A brake lining device comprising in combination an attaching band, friction material secured to the face of said band, means at one end of the band for securing the same to a brake shoe flange, and spring fingers at the other end of the band for cooperating with the shoe flange, each of said fingers being composed of a front member and an integral rear member, the rear member being spaced from the front member and so shaped that the upper end of the member is adapted for engagement with the end of the flange of a brake shoe while a part of said member below the upper end is adapted for engagement with the under surface of the said flange.

10. A brake lining device comprising in combination an attaching band, means at one end of the band for securing one end of said band to the flange of a brake shoe, spring fingers at the other end of said band comprising integral front and rear members, the rear members being curved away from the front members so that when the attaching band is in place on a brake shoe the curved member will engage the lower edge of the end of the flange of the brake shoe with spring pressure.

11. In combination a flanged brake shoe, an attaching band, friction material secured to the face of said attaching band, one end of said band being interlocked with one end of said flange, said band overlying the flange and extending to the other end thereof, spring fingers at the last mentioned end of the attaching band comprising integral front and rear members, the rear members being curved away from the front members and engaging the lower edge of the end of the brake shoe flange with spring pressure.

12. In combination a flanged brake shoe, an attaching band, friction material mounted on the face of said band, one end of the band being interlocked with one end of the brake shoe flange, the band overlying the said flange and extending to the opposite end thereof, said opposite end of the flange being undercut, and a spring finger at this end of the attaching band engaging said undercut portion of the end of the shoe flange with spring pressure.

13. In combination a flanged brake shoe, an attaching band, friction material mounted on the face of said band, one end of said band being interlocked with the brake shoe flange, the opposite end of said flange being undercut to form a beveled end, said band overlying the brake shoe flange and the end adjacent said beveled end of the flange being provided with spring fingers the free portions of which engage the bevel of the flange with spring pressure and terminating short of the upper edge of said bevel.

ALLAN C. HOFFMAN.